Dec. 29, 1931.  I. L. KEITH  1,838,099
CEMENTING MACHINE
Filed June 20, 1930
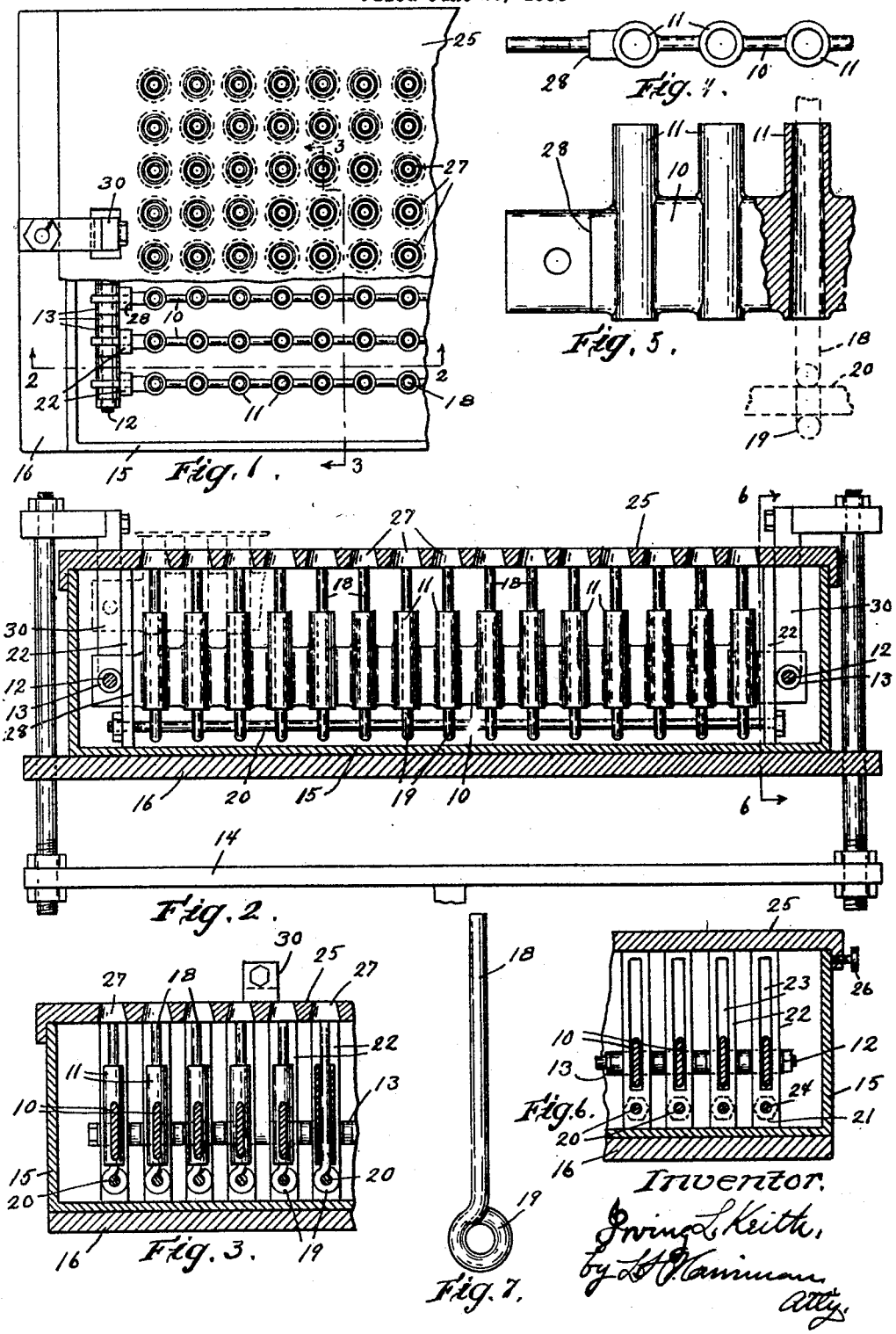
Inventor
Irving L. Keith
by L. H. Hamman
Atty.

Patented Dec. 29, 1931

1,838,099

UNITED STATES PATENT OFFICE

IRVING L. KEITH, OF HAVERHILL, MASSACHUSETTS

CEMENTING MACHINE

Application filed June 20, 1930. Serial No. 462,544.

This invention relates to certain improvements in cementing machines of the general type shown in McMurray Patent No. 1,293,147 of February 4, 1919 and more particularly to improvements on the particular machine disclosed in the application of Arthur W. Smith, Serial No. 413,506 filed December 12, 1929, in which the grid comprises a series of vertically disposed tubes, which are raised and lowered within the cement containing receptacle, the top ends of said tubes being disposed at a uniform level and providing cement applying faces, and is combined with a corresponding series of vertically disposed fixed rods which are arranged within said tubes and act to prevent the cement from becoming suspended across the top ends of the tubes and thus from applying cement to a greater portion of the surface of the sheet material to be cemented than will be applied by the top ends of the tubes alone.

In machines of this character, which employ a cementing grid which is submerged in the cement and lifted above its surface to perform the cementing operation, it is necessary, as a practical matter, during the periods of disuse, to remove all parts from the cement-containing receptacle and submerge them in water until they are to be used again. While the manner in which the work is performed by the machine disclosed in said application Serial No. 413,506 is entirely satisfactory, a serious objection to a machine constructed as shown is due to the fact that, when the plate in which the tubes are mounted is removed, it will become separated from the cement removing rods, which are disclosed as fixed in the bottom of the pan, and considerable difficulty is likely to be encountered in restoring the parts to their original positions, as each rod must be correctly aligned with its corresponding tube before this can be done, and, if a rod should become slightly bent or otherwise misaligned with its tube, the difficulty of restoring the parts would be greatly increased.

The construction disclosed is also expensive to manufacture, and great accuracy is necessary in producing the same to enable the parts to be assembled. It has also been found difficult to operate on account of the fact that, even though the plate in which the tubes are mounted is provided with numerous apertures through which the cement may flow when it is lifted, the cement does not flow through these apertures with sufficient readiness to prevent a substantial portion of the contents of the pan from being lifted, or to prevent the formation of a partial vacuum beneath the plate, so that the force required to lift the plate, or grid is objectionably great.

The objects of my invention are to provide a construction which will operate in the same manner and will produce the same results as the machine of said application, but which is so constructed that all the parts may be readily removed from the cement containing pan and placed in a water holding container without withdrawing the cement removing rods from the tubes. Also to provide a construction which may be produced at comparatively small expense with a minimum of machine work, permitting the parts to be constructed principally from castings and parts made by automatic machinery and to be readily assembled. Also to provide a form of grid which will readily become free of liquid cement when lifted therefrom, so that the force required to operate the machine will be no greater than with the ordinary bar type of grid previously employed.

I accomplish these objects by means of the construction described in the following specification and illustrated in the accompanying drawings, in which:—

Fig. 1 is a plan view of a section of a grid, partly broken away, embodying my invention.

Fig. 2 is a sectional view thereof, at line 2—2 of Fig. 1.

Fig. 3 is a sectional view at line 3—3 of Fig. 1.

Fig. 4 is a top edge view, on an enlarged scale, of one end portion of one of the grid bars.

Fig. 5 is a side elevation thereof, partly in section.

Fig. 6 is a sectional view at line 6—6 of Fig. 2.

Fig. 7 is a detail view of one of the cement removing rods.

According to my invention I provide a grid which is composed of a series of flat bars 10, which are arranged in parallelism, side by side and mounted on side rods 12, which pass thru the end portions thereof, said bars being spaced apart by sleeves, or washers 13 and clamped together by nuts on the ends of the rods 12 in a well known manner, as for example illustrated in my prior Patent No. 1,311,605, said rods 12 being connected in any suitable manner to a lifting yoke 14, which, in practice, will be treadle operated, so that the grid, which will be held in a horizontal plane with the sides of the bars 10 vertical, may be raised and lowered in a cement containing receptacle 15 mounted on a suitable support 16.

The bars 10 are of cast metal and formed to provide a series of regularly spaced tubes 11 therein, which are formed integrally therewith and arranged perpendicularly to the top and bottom edges of the bars. The tubes 11, or tubular portions of the bars 10, are of the same diameter externally and this diameter is somewhat greater than the thickness of the bars between the same, so that the tubular portions protrude to a uniform extent at each side of the bars, as shown in Fig. 4. The tubular portions 11 also terminate at the level of the bottom edges of the bars, but extend vertically for a suitable distance above the top edges thereof, the top end of each tube providing an annular cement applying face, all of said faces being in the same horizontal plane. The bore of said tubes taper slightly from bottom to top and are open throughout the lengths thereof.

I further provide a series of straight stiff metal wires, or rods 18, the diameter thereof being slightly less than the internal diameter of the tubes 11 at the top ends thereof. Each wire 18 is bent to provide an eye 19 in one end thereof, as shown in Fig. 7. One of said wires 18 is located within each tube 11 and an anchoring rod 20 is passed thru the eye 19 of each wire which is located in the tubes of a single bar 10. A holding clip 22 is provided at each end of each bar 10, each clip being provided with a longitudinal slot 23, through which the end portion of the bar extends somewhat loosely, and with an aperture 24 through which one end portion of a rod 20 is extended, and removably secured by means of nuts 21 on the ends thereof.

The receptacle is provided with a flat cover 25 which is secured in position thereon in any convenient manner, as by a set screw 26, and said cover is provided with perforations 27 which are arranged in central alignment with the tubes 11 and are of sufficient diameter to permit the top ends of said tubes to pass freely therethru, said perforations being preferably tapered from the bottom side of the cover to the top side thereof. The clips 22 are of a length sufficient to extend from the bottom of the receptacle 15 to the under side of the cover 25, and, when the parts are in position, said clips are held in vertical positions by the rods 12 at one side and by shoulders 28 on the bars 10 at the opposite side, see Figs. 2, 4 and 6, and are held against upward movement by the cover 25. The slots 23 are of sufficient length to permit the bars 10 to be lifted to the extent necessary, while the clips 22 are held down by the cover 25.

The parts above described may be assembled in various ways. For example, the clips 22 may be placed in position on the bars 10 and then the bars clamped together by the rods 12, thus forming the grid. A wire 18 may then be placed in each tube of each bar and a rod 20 may be passed thru each eye 19 of the wires in the tubes of each bar and the end portions of each rod 20 will be passed through the apertures 24 in the clips 22 at each end of each bar and secured against longitudinal movement therein. The depending portion 30 of the lifting yoke will usually be connected to the grid at the time it is assembled, and a connecting means will be provided which enables the grid to be readily connected to, and disconnected from the lifting yoke. The cover is placed in position on, and secured to the receptacle after the grid has been placed therein, and then the connections are made with the yoke.

The wires 18 are of such length that, when held in position as above described, their upper ends will terminate at a uniform level closely adjacent the under side of the cover plate 25.

In using the machine for cementing linings, doublers, etc., the receptacle will be filled with liquid cement to some level above the level of the top ends of the tubes 11, when the grid is in its lowest position, as shown in the full line position of Fig. 2.

When the grid is lifted the end portions of the bars 10 will be moved upward in the slots 23 of the clips 22, while the wires 18 will be held from upward movement by the rods 20, which are engaged with the clips, the latter being held down by the cover 25. The upward movement of the grid is limited by any suitable stop, as by the engagement of the yoke with the support on which the pan is mounted, this movement being limited at a point which permits the tubes 11 to pass thru the apertures 27 in the cover and protrude for a short distance above its top side, as shown in the dotted line position of Fig. 2, so that the piece to be cemented may be laid on the cement applying faces at the top ends of the tubes. The withdrawal of the wires 18 from the top portion of the tubes 11 after they have been lifted above the cement level acts to prevent the cement from becoming suspended in strings or bubbles across the bore of the tubes, and the passage of the tubes thru the apertures of the cover prevent the cement from becoming suspended between the tops of adjacent tubes, so that the cement will only be applied to the surface to be cemented in small circles or annuluses.

By forming the tubes in separate bars, which, as shown, are preferably reduced to a thin edge at top and bottom, the up and down movement of the grid in the cement is but slightly impeded, enabling the use, if desired, of a heavy, slow flowing cement, and also enabling the machine to be operated with a minimum amount of effort.

When use of the machine is to be discontinued, the grid may be disconnected from the lifting means, and, after removal of the cover all the parts within the receptacle will be lifted therefrom, the wires 18 being retained in position within the tubes by the rods 20 which are held by the clips 22, the latter being supported by the bars 10.

The combined grid bars and tubes, as above described, may be made by a die casting method and the other parts of the machine may be made by equally unexpensive methods. Also if any of the parts become broken or otherwise unfit for use, new parts may be readily supplied.

It will be understood that while the tubular portions which project upwardly from the bars are shown as of cylindrical form, and provide circular cement applying faces, as a matter of convenience in construction, that any tubular formation which will provide any suitable annular form of cement applying face will be within the spirit scope of my invention.

I claim:

1. In a cementing machine of the character described, a grid comprising a series of horizontally disposed, suitably spaced parallel bars, each bar having a series of integral projections extending vertically from its top edge, and each projection having an open passage extending from its top end to the bottom side of the bar, to provide a series of annular cement applying faces on the top ends of said projections arranged at a uniform level, and means for removing surplus cement adjacent said faces.

2. In a cementing machine of the character described, a grid comprising a series of horizontally disposed flat bars arranged in parallelism with their flat sides extending vertically and spaced apart to permit the same to be readily raised and lowered in a liquid body, each bar having a series of open ended passages extending vertically therein and a corresponding series of tubular bosses extending from the top edge thereof, to form continuations of said passages and provide annular cement applying faces at their top ends, arranged in the same plane surface for simultaneous application of the work thereto.

3. In a cementing machine of the character described, a grid comprising a series of suitably spaced flat metal bars arranged side by side and adapted to be supported with their sides vertical and their top and bottom edges horizontal, each of said bars having a series of suitably spaced thickened portions extending perpendicularly to its top and bottom edges and projecting, in the form of bosses, above its top edge, each thickened portion and its boss having a continuous open passage extending from the top edge of the boss to the bottom edge of the bar, and forming an annular face at the top end of each boss, said faces being arranged in the same plane surface for the simultaneous application of the work thereto.

4. A cementing machine of the character described having a receptacle and a grid horizontally disposed and vertically movable therein, said grid comprising a series of suitably spaced parallel bars, each having a series of projections extending vertically therefrom, and each of said projections having a passage extending vertically therethru from its top to the bottom side of the bar, providing an annular cementing face on the top end thereof, a rod located in each of said passages, anchoring means for said rods located beneath said bars and removably connected to the lower ends thereof, a loose connection between said anchoring means and said grid arranged to permit limited vertical movement of the latter relative thereto, and means for normally holding said anchoring means in fixed relation with the receptacle.

5. A cementing machine of the character described having a receptacle and a grid horizontally disposed and vertically movable therein, said grid comprising a series of suitably spaced parallel bars, each having a series of projections extending vertically therefrom, and each of said projections having a passage extending vertically therethru from its top to the bottom side of the bar, providing an annular cementing face on the top end thereof, a cement removing rod located in each of said passages, an anchoring rod extending longitudinally of each bar beneath the same and removably engaged with the lower end portions of each cement-removing rod, and means for holding each anchored rod in fixed relation with said receptacle.

6. A cementing machine of the character described having a receptacle, and a grid horizontally disposed and vertically movable therein, said grid comprising a series of suitably spaced parallel bars, each having a series of projections extending vertically therefrom, and each of said projections having a passage extending vertically therethru from its top to the bottom side of the bar, providing an annular cementing face on the top end thereof a cement removing rod located in each of said passages, an anchoring rod extending longitudinally of each bar beneath the same and removably engaged with the lower end of each of said cement removing rods, a loose connection between said anchoring rods and the grid arranged to permit the grid to be raised to a limited extent while the rods are held stationary and means for holding said anchoring rods in fixed relation with the receptacle adapted to be disconnected to permit removal thereof from the receptacle with the grid.

7. A cementing machine of the character described having a receptacle, and a grid horizontally disposed and vertically movable therein, said grid comprising a series of suitably spaced parallel bars, each having a series of projections extending vertically therefrom, and each of said projections having a passage extending vertically therethru from its top to the bottom side of the bar, providing an annular cementing face on the top end thereof, a cement removing rod located in each of said passages, each rod having an eye in its lower end, an anchoring rod extending through the eyes of the rods in each bar, a clip engaged with each anchoring rod at each end thereof, and having a loose connection with the corresponding bars permitting limited lifting movement thereof, and means removable with said clips for holding said anchoring rods at the bottom of the receptacle.

8. A cementing machine of the character described comprising a receptacle, a grid vertically movable therein, said grid having a series of vertically disposed tubes providing a series of annular cement applying faces for application to the work, a series of cement removing rods respectively disposed in said tubes, anchoring devices removably engaged with the lower ends of said rods, and means removably engaged with said anchoring devices for holding them in fixed relation with the receptacle, and having a loose connection with said grid permitting limited lifting movement relative thereto.

9. In a cementing machine of the character described, a grid comprising a series of parallel, suitably spaced bars adapted to be disposed horizontally, each bar having a series of projections extending perpendicularly from the top side thereof, each projection having an open passage extending from its top end to the bottom side of the bar and providing an annular cementing face on the top end thereof, a corresponding series of cement removing rods disposed in said passages respectively, each having an eye in its lower end, an anchoring rod extending through the eyes of the rods in each bar, and a holding device for each end of each anchoring rod, having a loose connection with said grid permitting limited relative movement thereof and adapted to hold the rods stationary when the grid is lifted.

In testimony whereof, I have signed my name to this specification.

IRVING L. KEITH.